US010045227B2

(12) United States Patent
Rao et al.

(10) Patent No.: US 10,045,227 B2
(45) Date of Patent: Aug. 7, 2018

(54) MOBILE INFRASTRUCTURE FOR COASTAL REGION OFFSHORE COMMUNICATIONS AND NETWORKS

(71) Applicant: Amrita Vishwa Vidyapeetham, Tamil Nadu (IN)

(72) Inventors: Sethuraman N. Rao, Kerala (IN); Maneesha Vinodini Ramesh, Kerala (IN); P. Venkat Rangan, Tamil Nadu (IN)

(73) Assignee: Amrita Vishwa Vidyapeetham (IN)

( * ) Notice: Subject to any disclaimer, the term of this patent is extended or adjusted under 35 U.S.C. 154(b) by 52 days.

(21) Appl. No.: 15/076,998

(22) Filed: Mar. 22, 2016

(65) Prior Publication Data

US 2017/0230841 A1    Aug. 10, 2017

(51) Int. Cl.
| | | |
|---|---|---|
| *H04W 24/00* | (2009.01) | |
| *H04W 16/26* | (2009.01) | |
| *H04W 24/08* | (2009.01) | |
| *H04W 4/02* | (2018.01) | |
| *H04W 88/08* | (2009.01) | |

(52) U.S. Cl.
CPC .......... *H04W 16/26* (2013.01); *H04W 4/023* (2013.01); *H04W 24/08* (2013.01); *H04W 88/08* (2013.01)

(58) Field of Classification Search
CPC ............ H04B 7/18513; H04B 7/18584; H04B 7/185; H04B 7/18539; H04B 10/272; H04W 28/20; H04W 4/046; H04W 72/044; H04W 76/028; H04W 16/26; H04W 24/08; H04W 4/023; H04W 88/08; H04W 4/02; H04W 4/16; H04W 52/0245; H04W 84/042
USPC ..................... 455/456.1, 11.1, 431; 705/26.1
See application file for complete search history.

(56) References Cited

U.S. PATENT DOCUMENTS

| | | | | |
|---|---|---|---|---|
| 9,185,603 B1 * | 11/2015 | McCarthy | .......... | H04B 7/18539 |
| 2009/0318139 A1 * | 12/2009 | Su | ...................... | H04B 7/18506 455/431 |
| 2009/0319391 A1 * | 12/2009 | Su | .......................... | G06Q 30/06 705/26.1 |
| 2014/0099882 A1 * | 4/2014 | Woosnam | .............. | H04H 20/02 455/12.1 |

* cited by examiner

*Primary Examiner* — Shaima Q Aminzay
(74) *Attorney, Agent, or Firm* — Donald R. Boys; Central Coast Patent Agency, Inc.

(57) ABSTRACT

A marine communication system has an on-shore base station providing a long-range network, an Internet router connecting the base station to an Internet network, a plurality of first fishing boats in a cluster, each having an onboard Access Router, and at least one second boat in the cluster equipped with Adaptive Backhaul Equipment, including a directional antenna and a backhaul transceiver capable of accessing the network provided by the base station. The access routers provide communication with communication devices used by fishermen aboard the boats, and at least one Access Router communicates with the equipment aboard the at least one second boat in the cluster, thereby providing Internet connectivity and email, voice, text and video communication through the base station and the Internet network, to the fishermen aboard the boats in the cluster.

12 Claims, 2 Drawing Sheets

MOBILE INFRASTRUCTURE FOR COASTAL REGION OFFSHORE COMMUNICATIONS AND NETWORKS

BACKGROUND OF THE INVENTION

1. Field of the Invention

The present invention is in the technical area of network communications, and pertains more particularly to tracking of fishing vessels from base stations on land, and facilitating communication with and between vessels.

2. Description of Related Art

In many countries fishing in fresh water lakes or in the open sea, often in a loosely-defined area along a shoreline, is an important economic activity, engaging a relatively large number of fishing vessels, and employing a large number of people. In this activity there are certain dangers, which may come about because of a variety of reasons, such as equipment malfunctions or sometimes unexpected severe weather. Further, in many circumstances there is little or no ability for fishermen at sea to communicate with one another to coordinate activity, or to keep in touch with family at home, on land.

When emergencies arise, it is of course important to be able to respond to come to the aid of seafaring people whose lives and livelihood may be threatened. To do so requires knowledge of real-time location of fishing vessels and an ability to communicate with personnel aboard the vessels, and also in many cases, to communicate among different ones of the vessels as well as with at least one shore station. It is well-known, however, that equipment and techniques to accomplish such secure communication is quite expensive, and in many cases beyond the financial capability of owners of such vessels, and also of government agencies that have an interest in providing safety services.

Accordingly, what is needed is a new tracking and communication network that is far less expensive than conventional systems, yet will still provide the secure tracking and communication that is needed.

BRIEF SUMMARY OF THE INVENTION

In an embodiment of the invention a marine communication system is provided, comprising an on-shore base station providing a long-range WiFi point-to-multi-point (P2MP) network, an Internet router connecting the base station to an Internet network, a plurality of first fishing boats in a cluster, each having an onboard Access Router, and at least one second boat in the cluster equipped with Adaptive Backhaul Equipment (ABE), including a directional antenna and a backhaul transceiver capable of accessing the P2MP network provided by the base station. The Access Routers provide communication with wirelessly-enabled communication devices used by fishermen aboard the boats, including smart telephones, provide wireless communication with other Access routers aboard other boats in the cluster, and at least one Access router communicates with the ABE aboard the at least one second boat in the cluster, thereby providing Internet connectivity and email, voice, text and video communication through the base station and the Internet network, to the fishermen aboard the boats in the cluster.

In one embodiment the system further comprises a network operating center (NOC) operating on a processor either at the base station or aboard a boat in the cluster, providing operatives with functionality to monitor location of individual ones of the plurality of fishing boats, and with ability to communicate news and alerts to individual ones of the fishing boats. Also in one embodiment at least one of the fishing boats as an adaptive node periodically operates as a floating base station communicating with one or more other adaptive nodes at further distance from the on-shore base station, thus extending the range of the network to further clusters of boats.

In one embodiment the system further comprises a fishing boat having two ABEs, one attuned to the on-shore base station or to another floating base station, and the other attuned to communicate with one or more adaptive nodes further removed from the on-shore base station, thus extending communication to a fourth range greater than the third range. Also in one embodiment functionality is provided to select and assign function and responsibility to individual ones of the fishing boats in the network, dynamically re-configuring the network. And ion one embodiment the directional antenna is further enabled to rotate to maximize signal strength with any remote station to which it may be coupled.

In another aspect of the invention a marine communication method is provided, comprising providing a long-range WiFi point-to-multi-point (P2MP) network from an on-shore base station, connecting the base station to an Internet network by a gateway, equipping each of a first plurality of fishing boats as access nodes, each having an onboard Access Router, the plurality of fishing boats constituting a cluster, equipping at least one boat in the cluster with Adaptive Backhaul Equipment (ABE), including a directional antenna and a backhaul transceiver capable of accessing the P2MP network provided by the base station, providing communication by the Access routers with wirelessly-enabled communication devices used by fishermen aboard the boats, including smart telephones, providing by the access routers wireless communication with other Access routers aboard other boats in the cluster, and providing communication with the ABE aboard the at least one boat in the cluster, thereby providing Internet connectivity and email, voice, text and video communication through the base station and the Internet network, to the fishermen aboard the boats in the cluster.

In one embodiment the method further comprises establishing a network operating center (NOC) operating on a processor either at the base station or aboard a boat in the cluster, providing operatives with functionality to monitor location of individual ones of the plurality of fishing boats, and with ability to communicate news and alerts to individual ones of the fishing boats. Also in one embodiment at least one of the fishing boats as an adaptive node periodically operates as a floating base station communicating with one or more other adaptive nodes at further distance from the on-shore base station, thus extending the range of the network to further clusters of boats.

In one embodiment the method further comprises equipping a fishing boat in the cluster with two ABEs, one attuned to the on-shore base station or to another floating base station, and the other attuned to communicate with one or more adaptive nodes further removed from the on-shore base station, thus extending communication to a fourth range greater than the third range. Also in one embodiment functionality is provided to select and assign function and responsibility to individual ones of the fishing boats in the network, dynamically re-configuring the network. And in one embodiment the directional antenna is further enabled to rotate to maximize signal strength with any remote station to which it may be coupled.

DETAILED DESCRIPTION OF THE INVENTION

Figure 1:
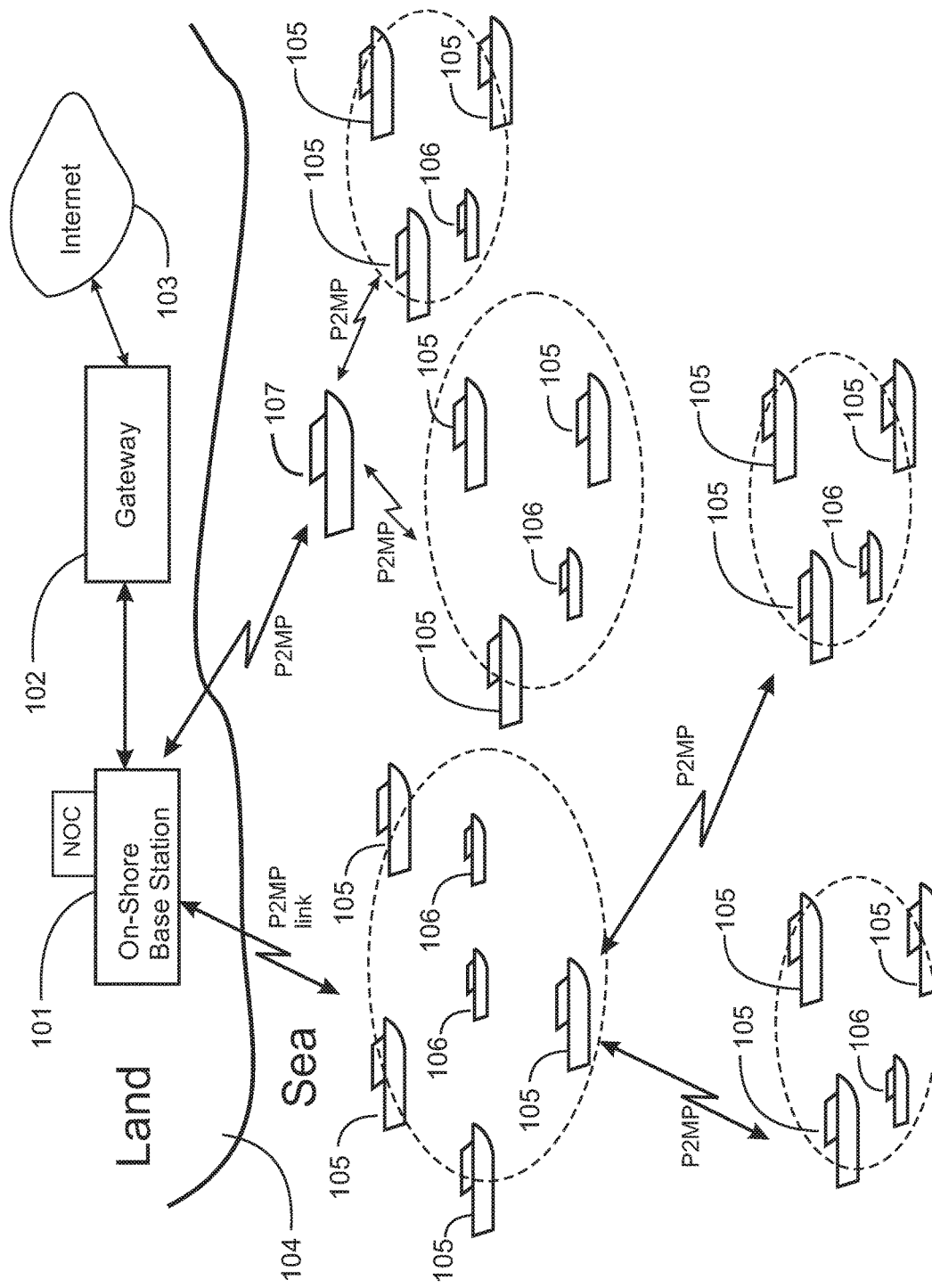
FIG. 1 is an architectural diagram of a network in an embodiment of the present invention.

In various embodiments and implementations of the invention described in specific examples below, with reference to figures filed with this application, a wireless communication system is provided as an effective and reliable way for fishermen to communicate amongst themselves and with the shore during emergencies and other times using text or email messages and voice calls. Video may also be supported. In various embodiments the system caters to near-shore circumstances, described as within 46 km, and also in other embodiments to groups of fishing boats at significantly greater separation from the shore.

There are a number of factors that contribute to the problem, which, of course, influence the nature of the system that solves the problem in different embodiments. These factors include:

Extreme mobility: Boats are free to move anywhere at any speed they can muster as opposed to constraints imposed on vehicles on a road.

Variation in density: Concentration of boats can be very dense around sea ports and in potential fishing zones and very sparse in some other regions. Spatio-temporal variation in boat density will bring in dynamic topology changes. This may bring in real-time complexity in routing the data Data rate variability: Depending on signal strength at a receiver, achievable data rate at a physical layer will vary significantly. Also the data rate required by the fishing vessels will vary with respect to the density of the boats and the applications they use at any point of time Directional antenna beam: Directional antennas provide extended range. However, directional antennas need to reorient dynamically towards a base station as a boat changes direction. Frequent connectivity fluctuations may occur due to small diversions in the alignment of directional antenna. So tight reorientation of antenna is necessary Mobile base station: Usually base stations are static, and on shore. However, a moving boat can act as a base station.

Sea state variations: The stability of boats at sea depends on the sea state and this has a bearing on the stability of the wireless links that constitute the system.

The system of the invention in various embodiments comprises long-range Wi-Fi (LR Wi-Fi) base stations, antennas and transceivers on individual fishing boats compatible with the base stations, called hereinafter in this specification Adaptive Backhaul Equipment (ABE), and 802.11n wireless routers connected to the ABE on each boat. The ABE is a backhaul radio on board individual boats, with a built in antenna. The ABE is capable of full-duplex communication, and is adaptive in the sense that it can play the role of a gateway to the backhaul network or that of a mobile base station to extend the range of the backhaul network.

LR Wi-Fi is chosen based on a comprehensive comparative study of various backhaul options, such as 2G, 3G, Wi-Fi, Wi-MAX, Cognitive Radio and LTE, based on cost, communication range, operating frequency, vendor availability, bandwidth requirement, data rate requirement and latency effects.

Long-Range Wi-Fi technology is an adaptation of 802.11 standards to provide long distance connectivity using directional antennas and some tweaks to the physical and MAC layers of 802.11n (or ac) stack. A significant difference is replacement of the CSMA-CA-based medium access with TDMA having scheduled time slots for clients to eliminate collisions. In addition, various parameters such as acknowledgement timeout, slot size, DIFS, etc., are tweaked in order to account for longer propagation delays in long-range Wi-Fi. Directional sector antenna of the base station, installed at an elevated location, ensures a fairly long line of sight to the nearest clients. The clients also employ directional sector antennas, mounted as high as possible, as a part of the client's ABE.

FIG. 1 is an architecture diagram displaying the dynamic architecture of the unique communication system of the invention in one embodiment. The network in this example is a hierarchical, multi-level point-to-multi-point (P2MP) network anchored at a base station 101 on shore. The on-shore base station 101 provides a first level P2MP network in the hierarchy. This first-level of the overall network provides guaranteed connectivity within its range as long as the base station is operational. This caters to the near-shore scenario for distances up to 40-45 km from the shore. In this example base station 101 is connected to Internet network 103 through a gateway 102. There is further a Network Operations Center (NOC) associated with the base station, which is described further later in this specification.

The overall network in any circumstance depends upon the number of boats with equipment compatible with the system, location of the boats, and differences in equipment and operational capability at each boat in the system. It may also be dependent on the directionality of the antenna in fishing boats.

In the operation of fishing boats it is a natural occurrence that several boats may concentrate together in the vicinity of one or more schools of fish that may have been encountered by one boat, which may communicate the fact of fish activity to other boats. Over passage of time as well, individual boats may move from one cluster to another, and some may be in transit at any point in time. Cluster concentration is illustrated in FIG. 1 by icons representing boats in clusters represented by dotted ovals in FIG. 1, of which five are shown in this example.

In any instant example, there may be several kinds of fishing boats distinguished both by size, fishing equipment, and for the purpose of this disclosure, by communication equipment. The most important distinguishing characteristic for the network system is the nature of and the capability of the equipment on individual ones of the boats.

Some boats, indicated in FIG. 1 by element 105, comprise Adaptive Backhaul Equipment (ABE) distinguished by a directional antenna and radio equipment tuned to two-way communication with a base station over the P2MP network, which may be base station 101 on shore. The ABE is connected by Ethernet cable to a wireless router cum access point, called here an Access router. Smart phones, tablets and other such Wi-Fi-enabled devices on the boat connect to the Access router over standard Wi-Fi protocol. Boats so equipped and functional are called in this system Adaptive Nodes (AdN). These nodes may adapt to communicate in periods of time with the on-shore base station, and in other periods of time to act as base stations extending the range of the network further from the land base station 101.

Some boats have only an Access router, and no ABE. These boats are indicated by element number 106 in FIG. 1, and are termed Access Nodes (AcN). They cannot communicate with either an on-shore or a floating base station, but can communicate with and through other boats that are within the WiFi range of the Access router.

Any boat within range of the land base station can serve as a range extender or a relay by providing a P2MP network further into the sea. For this purpose, such a boat comprises a second ABE also connected to the Access router. This second ABE plays a role of a mobile, floating base station. The network can be extended to any level opportunistically based on the availability of intermediate boats. Each additional level of range extension may add about 15-20 km to the achievable range. Boats so equipped in this embodiment are termed Super Nodes.

By incorporating delay tolerance at intermediate nodes, message delivery rates may be improved, albeit with a delay. As the density of boats at sea increases, as is typically the case near sea ports, the probability of locating a Super Node increases.

In this example, whenever the fishermen in a boat identify a fishing zone, they tend to pass on the message to their friends in the neighborhood using a code word. So a cluster of boats is formed naturally in the fishing zone, as described above, and the clusters are indicated in FIG. 1. In the MICRONet architecture, the boats within a cluster form a wireless mesh network.

As described further above, some boats, such as mid-size trawlers, will have an Access router and one ABE, and are known as Adaptive Nodes (AdN). An AdN may operate as a node in conjunction with nearby nodes in the network, by being connected to the base station and also accessible by other boats through the Wi-Fi of the router, but may also dynamically change its role to that of a mobile base station to extend the range of the overall network. In this case, the AdN may connect to the base station on shore through another AdN in its neighborhood, or directly, if within range. While some AdNs in a cluster will have their ABEs acting as gateways to the backhaul network, some AdNs will have their ABEs acting as mobile base stations to extend the range of the network. The ABE on an AdN can dynamically adapt itself to the appropriate role based on the current location of the boat and the needs of the network. When there are too many AdNs present in a dense cluster, a dynamically varying optimal subset of AdNs may be provisioned in the appropriate roles based on the location of the nodes and the received signal strength.

A Super Node (SuN) as described above can connect to the on-shore base station 101 and extend the range simultaneously. It does not need to be part of a cluster in order to do so. Each additional level of range extension will add about 15-20 km to the achievable range. By incorporating delay tolerance at the intermediate nodes, message delivery rates may be improved albeit with a delay.

Figure 2:
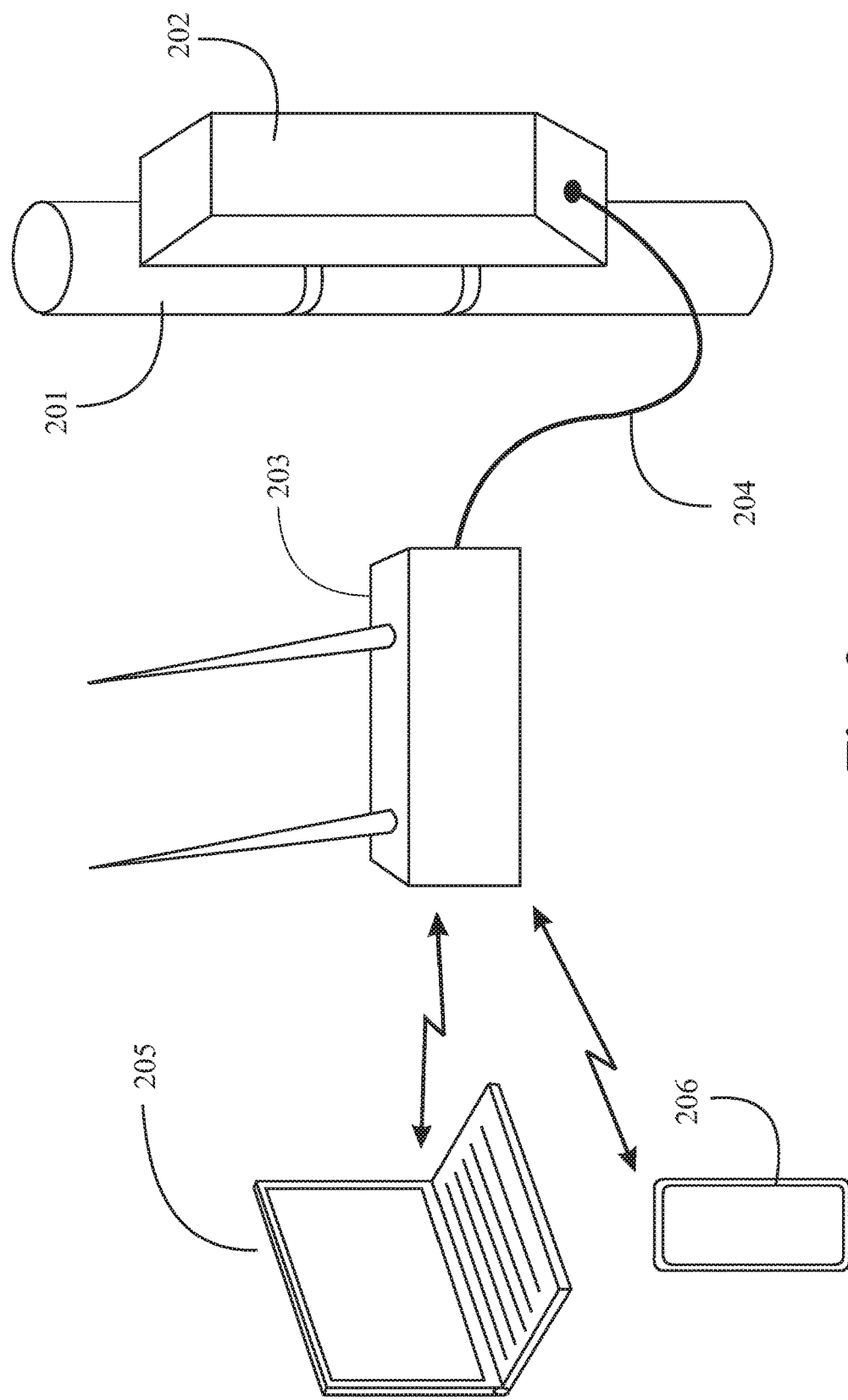
FIG. 2 is an illustration of equipment aboard a fishing vessel in an embodiment of the present invention.

FIG. 2 shows the equipment on board an Adaptive Node (AdN) in one embodiment. ABE 202 is coupled wirelessly to base station 101 (FIG. 1), or to another base station, such as a floating base station, over the P2MP LR Wi-Fi backhaul link. The ABE is also connected to Access router 203 by an Ethernet cable 204. End user devices (smart phones, tablets, laptops, etc.), such as smart phone 206 and laptop computer 205 connect to the Access router by standard Wi-Fi protocol. By connecting base station 101 on the shore to the internet, all the end user devices are internet enabled. They are able to access all the apps on their smart phones such as web browser, VoIP and messaging apps such as WhatsApp, YouTube, Skype, etc.

Part of the ABE of a node having a ABE is a directional antenna. Dynamic reconfiguration of the directional antenna can be implemented by mounting the antenna on a servo-motor-powered rotary platform 201 driven by a microcontroller. The microcontroller may compute the reorientation angle based on location of the boat and the base station and may operate the servo motor to rotate the antenna accordingly. Trawlers are usually equipped with a GPS receiver. A suitable gyroscopic mounting to dampen the effect of undulations of the boat due to rough sea state may also be used. In order to keep costs low, this readjustment may be done manually also even though it may not give the best results.

A Network Operations Center (NOC) will be located as a part of the base station on shore for managing and monitoring the network. Further a hierarchy of NOCs at the sea port level, regional level, state level, central level, etc., may be provided. Several valuable services are provided in different embodiments of the invention by the NOC to benefit fishermen. The NOC is enabled to track the boats and ships in the region and to provide an early warning system for collision avoidance of fishing boats with ships. The NOC may also provide a timely alert to fishing boats to enable them to move out of danger. In addition, the NOC can detect intrusion of unauthorized fishing vessels, provide an alert to the fishing vessel when it goes near the maritime border, etc.

The network may also be used in different embodiments as a platform for enabling a wide range of services, such as e-health services, e-commerce services, for providing real-time weather alerts, entertainment, education, and much more. Providing internet access to fishermen on fishing boats at sea will go a long way towards improving the quality of life of the fishermen while they are at sea.

It will be apparent to the skilled person that a novel communication system may be established for cooperating fisherman, according to above description, by equipping their fishing boats with compatible equipment and connecting the on-board equipment with a base station, and that the resulting network may be established at several different levels.

At a first hierarchical level of such a network, individual boats may be equipped with ABEs and routers, the ABEs constituting directional antennas and transceivers, to be able to connect to the base station and to establish communication with other boats having Access routers but not ABEs in a nearby cluster. The boats with ABEs may be termed Adaptive Nodes. An Adaptive node may communicate directly with the base station by means of the directional antenna, and may then serve as central nodes for separate clusters of other fishing boats, which may communicate through the Adaptive node to the base station and beyond. A special function of an adaptive node is to be able to switch between its function as a central node for a cluster, and as an extension node to other adaptive nodes in other clusters at a further distance from the base station, to extend the overall range of the network. To operate in this way, the adaptive node has to have periodic operation in each mode and must have caching of messages and the like to serve both functions. The switching and periodicity may be managed by the NOC at the on-shore base station according to need.

In a second hierarchical level some boats may be equipped as Super nodes, having two ABEs, one tuned full time to the base station, or to another Super Node, and the other to another adaptive node or Super Node further out in the network. A super node will have an Access router connected to its ABEs, and may also serve as a hub for a local cluster, but this is not a requirement for a Super Node. A Super Node may be a relay base station positioned to hop communications further out into the backhaul network. A Super Node is one that can act as both a gateway to the backhaul network (to connect to the base station at the previous level) and a mobile base station (to provide the next level of P2MP hierarchy) at the same time. For this purpose, it is equipped with two ABEs connected over Ethernet to an Access Router.

It will be apparent that the nature and operation of a network in an embodiment of the present invention will be largely dependent on the number of subscribing fishing boats and upon the equipment and capability of individual ones of such boats. Given a set of equipped and cooperating boats operatives in a NOC at a base station may schedule and operate a network for that set of boats according to the capability set of the boats, and different boats may be assigned different responsibilities and tasks in the network, much of which will be transparent to the fishermen in the boats. One base station and operating center may thus operate more than one cooperative network of fishing boats, perhaps one for near-shore fisherman, and another for a group of fishing boats more intent on searching out lucrative fishing clusters further from shore.

A NOC is not limited to a base station, but may also be implemented in a controller aboard one or more boats in a cluster, and more than one cooperative network of fishing boats may be configured either at a base station or on board a boat.

It will be apparent that networks in different embodiments of the present invention may be fashioned using any combination of the equipment and functionality described above, and that the embodiments described above are meant to be examples of a broader invention, and not to establish limits to the invention. The breadth of the invention is established only by the claims below.

The invention claimed is:

1. A marine communication system, comprising:
    an on-shore base station providing a long-range WiFi point-to-multi-point (P2MP) network;
    an Internet router connecting the on-shore base station to an Internet network;
    a plurality of boats in a cluster, each having an onboard Access router; and
    at least one boat in the cluster equipped with Adaptive Backhaul Equipment (ABE), including a directional antenna and a backhaul transceiver capable of accessing the P2MP network provided by the on-shore base station thereby providing a first range of communication;
    wherein the Access routers provide communication with wirelessly-enabled communication devices used by fishermen aboard the boats, including smart telephones, provide wireless communication of a second range with other Access routers aboard other boats in the cluster, and at least one Access router communicates with the ABE aboard the at least one boat in the cluster, thereby providing Internet connectivity and email, voice, text and video communication through the on-shore base station and the Internet network, to the fishermen aboard the boats in the cluster.

2. The marine communication system of claim 1 further comprising a network operating center (NOC) operating on a processor either at the on-shore base station or aboard a boat in the cluster, providing operatives with functionality to monitor location of each of the boats, and with ability to communicate news and alerts to individual ones of the boats.

3. The marine communication system of claim 1 wherein at least one of the boats as an adaptive node periodically operates as a floating base station communicating with one or more other adaptive nodes at further distance from the on-shore base station, thus extending the range of the network to further clusters of boats providing a third range of communication.

4. The marine communication system of claim 3 further comprising at least one of the boats having two ABEs, one attuned to the on-shore base station or to another floating base station, and the other attuned to communicate with one or more adaptive nodes further removed from the on-shore base station, thus extending communication to a fourth range greater than the third range.

5. The marine communication system of claim 4 wherein functionality is provided to select and assign function and responsibility to individual ones of the boats in the network, dynamically re-configuring the network.

6. The marine communication system of claim 1 wherein the directional antenna is further enabled to rotate to maximize signal strength with any remote on-shore or floating base station to which it may be coupled.

7. A marine communication method, comprising:
    providing a long-range WiFi point-to-multi-point (P2MP) network from an on-shore base station;
    connecting the on-shore base station to an Internet network by a gateway;
    equipping each of a plurality of boats as access nodes, each having an onboard Access router, the plurality of boats constituting a cluster;
    equipping at least one boat in the cluster with Adaptive Backhaul Equipment (ABE), including a directional antenna and a backhaul transceiver capable of accessing the P2MP network provided by the on-shore base station, thereby providing a first range of communication;
    providing communication by the Access routers with wirelessly-enabled communication devices used by fishermen aboard the boats, including smart telephones;
    providing by the access routers wireless communication of a second range with other Access routers aboard other boats in the cluster; and
    providing communication with the ABE aboard the at least one boat in the cluster, thereby providing Internet connectivity and email, voice, text and video communication through the on-shore base station and the Internet network, to the fishermen aboard the boats in the cluster.

8. The marine communication method of claim 7 further comprising establishing a network operating center (NOC) operating on a processor either at the on-shore base station or aboard a boat in the cluster, providing operatives with functionality to monitor location of individual ones of the boats, and with ability to communicate news and alerts to individual ones of the boats.

9. The marine communication method of claim 7 wherein at least one of the boats as an adaptive node periodically operates as a floating base station communicating with one or more other adaptive nodes at further distance from the on-shore base station, thus extending the range of the network to further clusters of boats providing a third range of communication.

10. The marine communication method of claim 9 further comprising equipping a boat in the cluster with two ABEs, one attuned to the on-shore base station or to another floating base station, and the other attuned to communicate with one or more adaptive nodes further removed from the on-shore base station, thus extending communication to a fourth range greater than the third range.

11. The marine communication system of claim 8 wherein functionality is provided to select and assign function and responsibility to individual ones of the boats in the network, dynamically re-configuring the network.

12. The marine communication system of claim 7 wherein the directional antenna is further enabled to rotate to maximize signal strength with any on-shore or floating base station to which it may be coupled.

\* \* \* \* \*